(12) United States Patent
Wheeler

(10) Patent No.: US 6,742,787 B1
(45) Date of Patent: Jun. 1, 2004

(54) ATV TRAILER

(76) Inventor: Steven A. Wheeler, 3664S. 3850W., West Haven, UT (US) 84401

( * ) Notice: Subject to any disclaimer, the term of this patent is extended or adjusted under 35 U.S.C. 154(b) by 0 days.

(21) Appl. No.: 10/422,875

(22) Filed: Apr. 24, 2003

(51) Int. Cl.[7] .................... B62D 63/06; B62D 25/16
(52) U.S. Cl. .................... 280/5.26; 280/789; 280/160
(58) Field of Search ................. 280/5.26, 5.2, 280/160, 160.1, 789; D12/101, 105

(56) References Cited

U.S. PATENT DOCUMENTS

| | | | |
|---|---|---|---|
| 1,191,394 A | * | 7/1916 | Brown et al. .......... 280/5.26 |
| D151,240 S | | 10/1948 | Inskeep |
| 4,149,748 A | * | 4/1979 | Tanner .......... 296/168 |
| 4,264,082 A | | 4/1981 | Fouchey |
| 4,709,772 A | | 12/1987 | Brunet |
| 4,790,548 A | | 12/1988 | Decelles |
| 5,082,307 A | | 1/1992 | Hollingworth |
| 5,273,296 A | * | 12/1993 | Lepek .......... 280/5.2 |
| 5,513,868 A | | 5/1996 | Barr |
| 5,782,490 A | * | 7/1998 | Kendall et al. .......... 280/789 |
| 6,378,904 B1 | * | 4/2002 | Niehoff .......... 280/789 |

* cited by examiner

Primary Examiner—Kevin Hurley

(57) ABSTRACT

This device is a trailer hitched to an atv or off road vehicle to haul cargo over an uneven or rough terrain. The trailer has a frame of steel tubing, a main axle, low pressure tires, trailer cargo box. The axle is comprised of a plurality of wheels rotatable about an axes that are fixed with respect to a cluster arm where cluster arm itself is rotated about an axis so that the wheels will rotate or climb over uneven terrain.

The cargo box is constructed of a plastic composite material.

2 Claims, 6 Drawing Sheets

ATV TRAILER

BACKGROUND OF THE INVENTION

The field of the invention is ATV Trailers.

Hunters and other outdoor enthusiasts frequently use all-terrain(ATV's) to travel into areas not accessible by other means of transportation (e.g. forested, rocky, steep areas.) Trailers pulled behind ATVs need to be capable of traversing rocky terrain with numerous obstacles.

This invention pertains to land vehicles generally, and more specifically to trailing vehicles configured for optimum performance with All-terrain vehicles (ATV) or off road vehicles. Most specifically, the preferred embodiment of the invention is a trailer for an ATV which traverses rough terrain.

Several ATV trailers are known in the prior are U.S. Pat. No. 5,645,292 to McWilliams et al. discloses an ATV trailer made from tubing, however, its suspension and wheel assembly is different from the present invention. U.S. Pat. No. Des. 151,240 to Inskeep discloses an ATV trailer with a torsion axle assembly and is unlike the present invention. U.S. Pat. No. 5,082,307 to Hollingworth discloses a ATV trailer with a ground engaging means including a common axle assembly unlike the present invention.

BRIEF SUMMARY OF THE INVENTION

The invention is an ATV trailer which has a frame of steel tubing, a heavy duty main axle to which on each end is attached a cluster arm comprising a plurality of wheels rotatable about an axes that are fixed with respect to a cluster arm where cluster arm itself is rotated about an axis so that the wheels will rotate or climb over uneven terrain. The cargo box of the trailer is constructed of a weather resistant composite plastic. The trailer has attached fenders and corner angles to strengthen the frame to tongue construction. An object of the invention is to provide an ATV trailer which can be used to transverse uneven terrain's without the cargo being disturbed from the movement of the cargo box.

Another object of the invention is to provide an ATV trailer which can be used to haul all types of cargo.

DETAILED DESCRIPTION OF THE INVENTION

Figure 1:
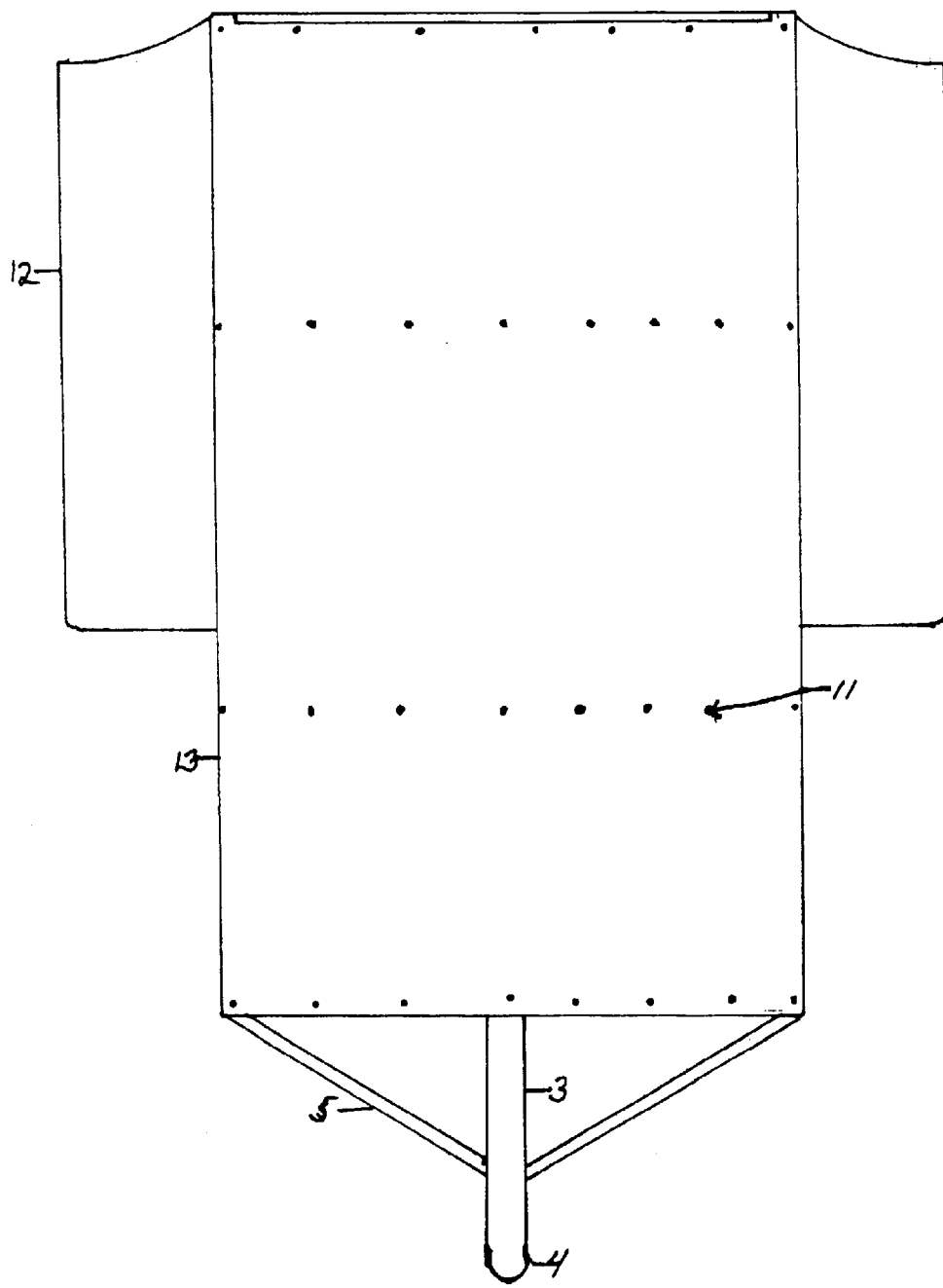
FIG. 1. is a top view
Figure 2:
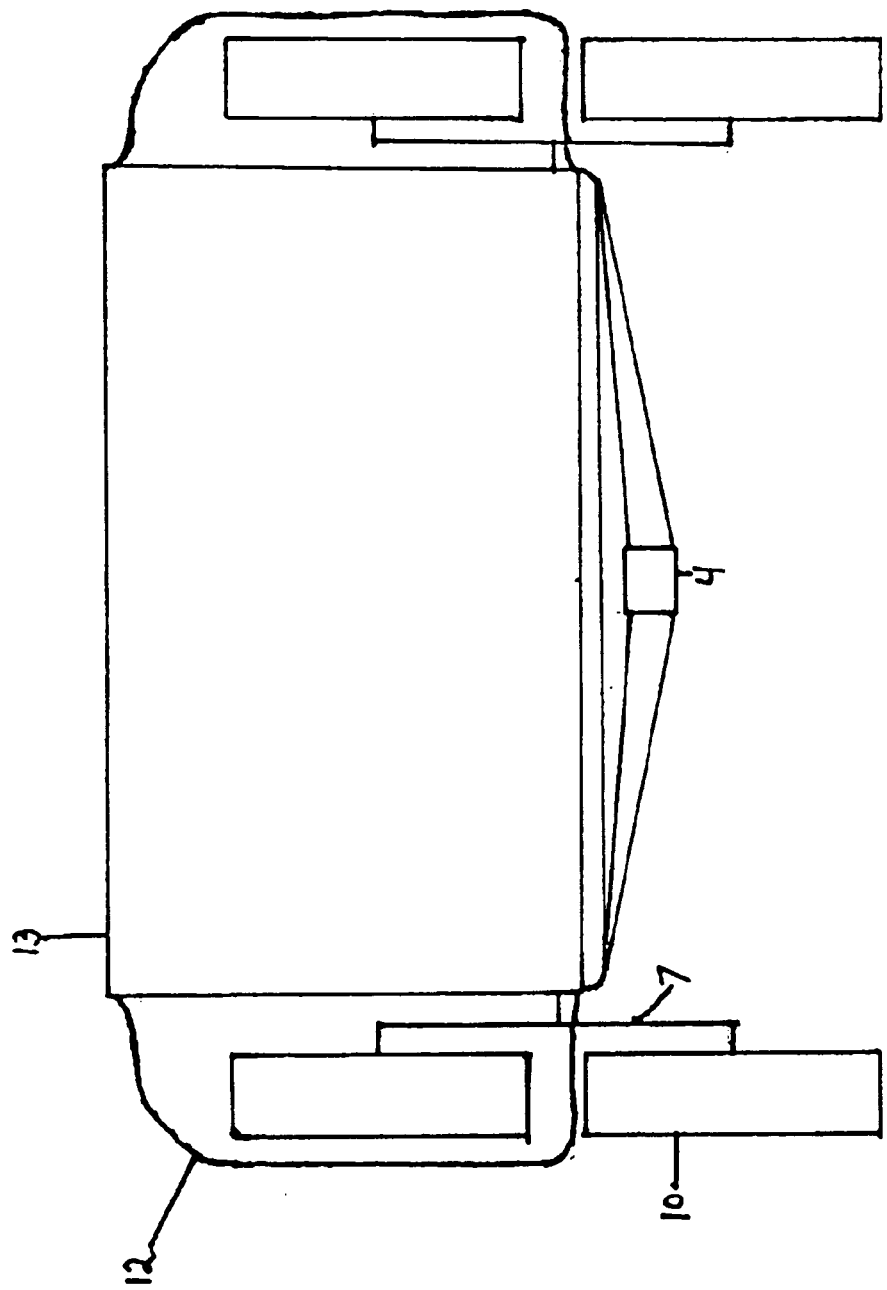
FIG. 2. is a front view
Figure 3:
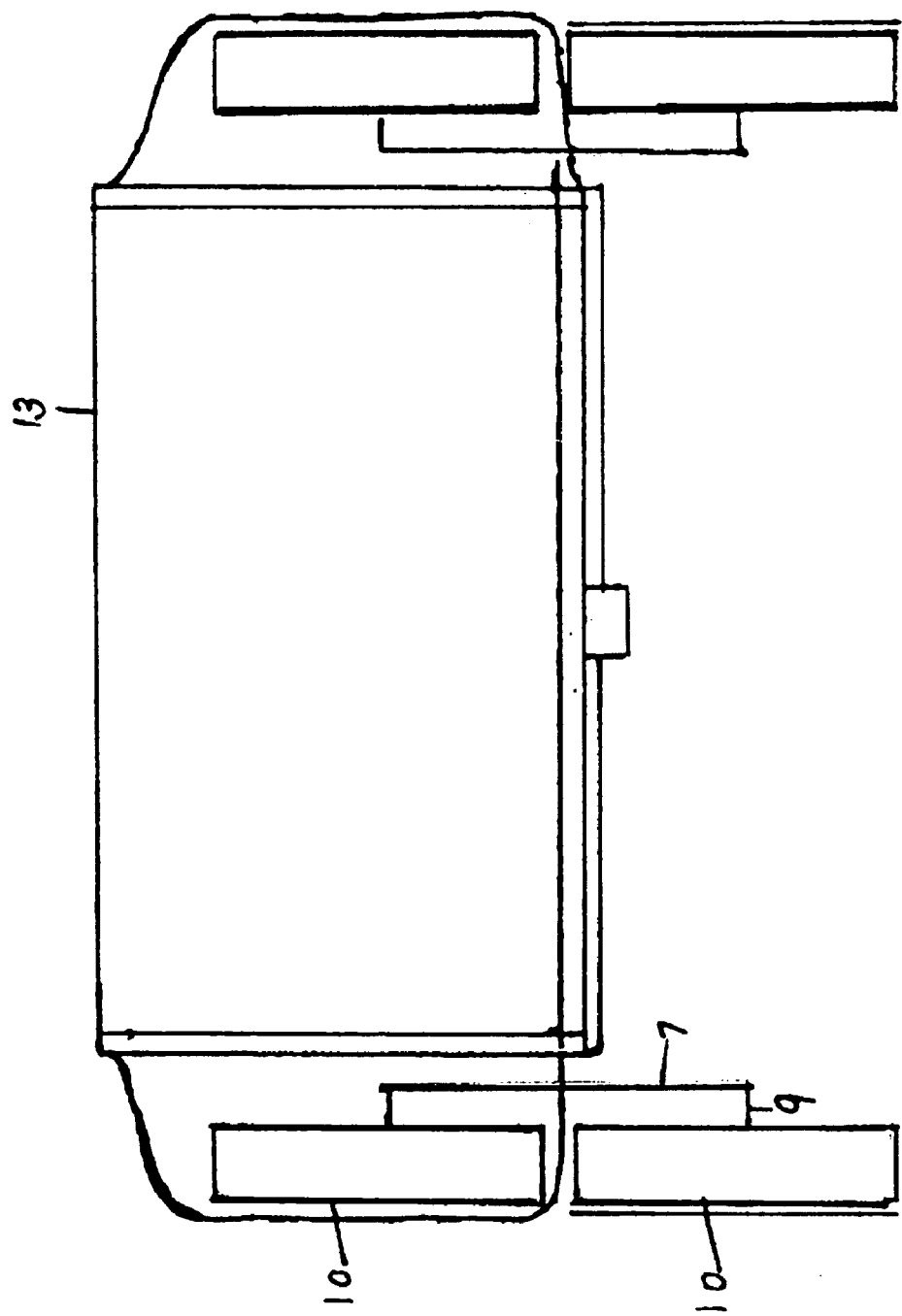
FIG. 3. is a rear view
Figure 4:
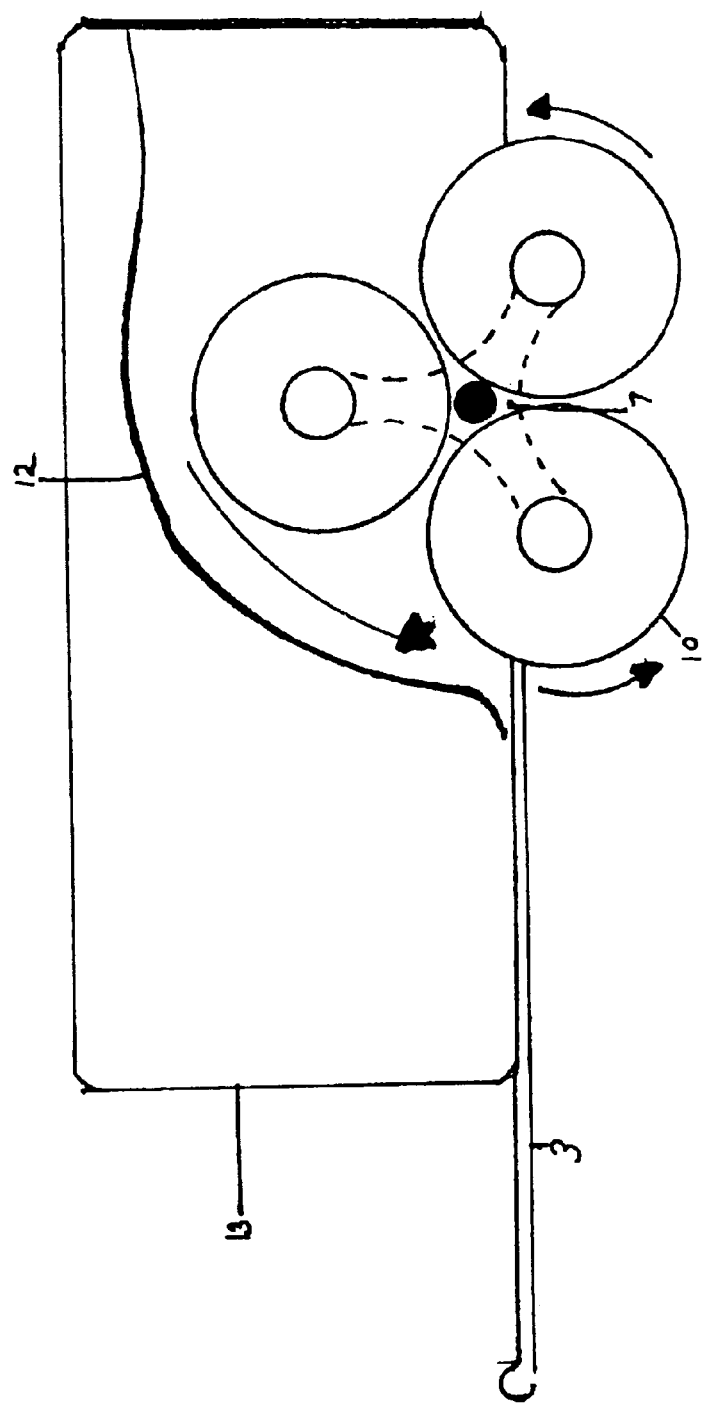
FIG. 4. is a side view.
Figure 5:
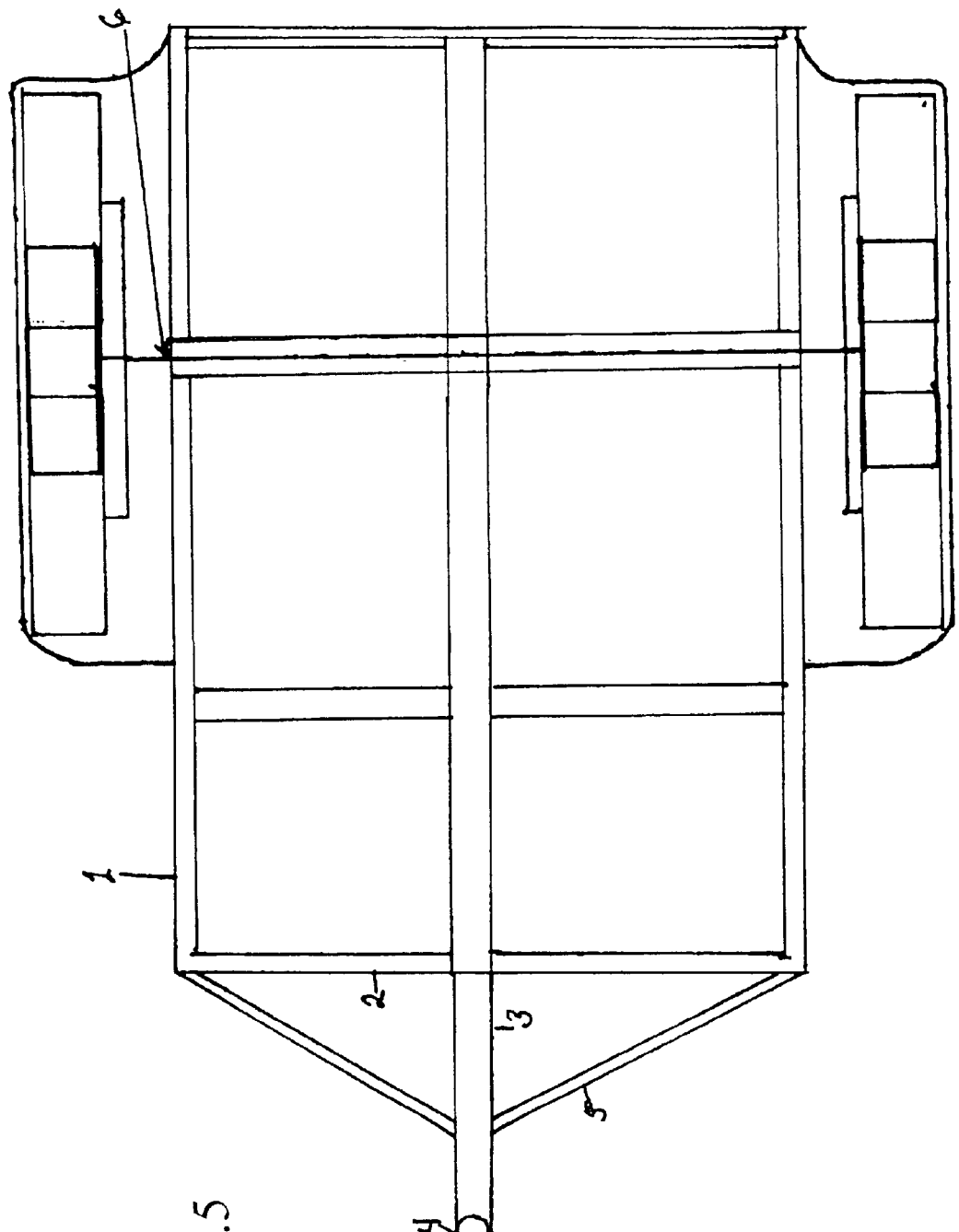
FIG. 5 is a bottom view.
Figure 6:
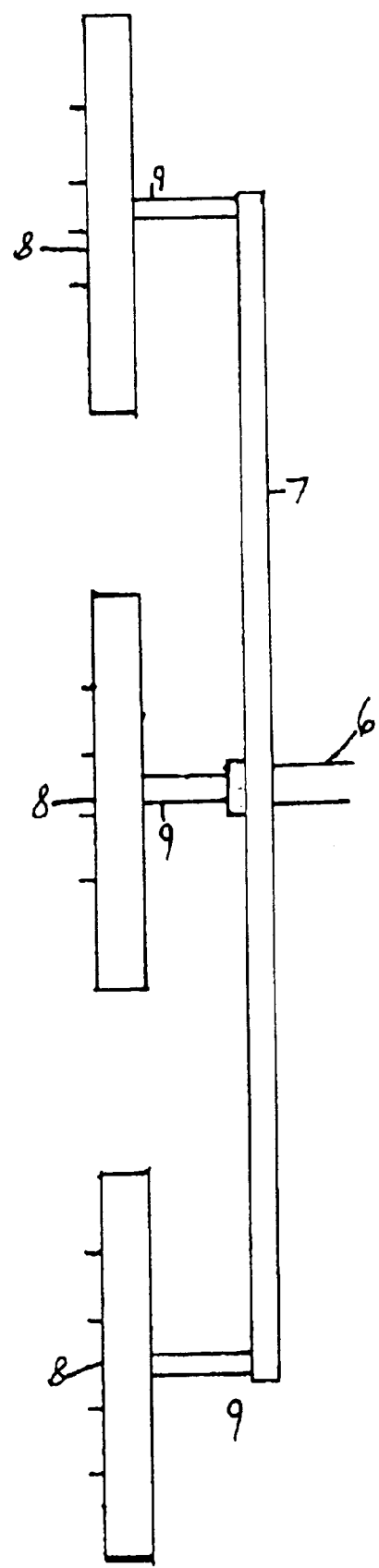
FIG. 6 is a cluster arm detail

The ATV trailer has a framework wherein all frame members are square tubing, one and one-half inches long on each side and made of steel. The frame members are connected to each other to form the bottom, sides, front, and back of the trailer, each of these has at least two parallel horizontal frame members (1) and at least two parallel vertical frame members (2). The drawings show the preferred configuration wherein the bottom has three horizontal and four vertical members. The center horizontal frame member on the bottom extends forwardly to form a tongue (3), which attaches to the ATV by conventional hitching means such as a ball hitch (4). Two angles (5), are welded onto the frame to strengthen the tongue (3) to frame connection.

The third vertical frame member (counting from the front) on the bottom has a axle (6) welded to it. The axle is stronger than necessary for carrying anticipated loads to allow the trailer to travel over rocks and other obstacles.

Cluster arm assembly (7) is mounted at the end of main axle (6) with conventional bearing attachment methods. Wheels (8) are attached to the end of each cluster arm stub axles (9) large tires (10) are mounted on each wheel (8) at the end of each cluster arm with conventional bearing attachment methods.

The tires (10) are of the same type and size as ATV tires in order to provide flotation and allow the trailer to follow in the same path as the ATV.

The trailer box (13) is connected of a composite plastic material and bolted through box into the frame members with bolts (11).

The fender (12) is attached to the horizontal side of the trailer box (13) and extend upwardly, rearwardly, and then downwardly then upwardly to rear of trailer in a spaced relation above the tire (10) on its respective side of trailer. The fenders (12) prevent mud and other debris from splashing onto the drivers of the ATV, and also protect cluster arm assembly from tree branches getting caught in assembly.(7)

I claim:

1. A trailer that will traverse over uneven or varied terrain said trailer comprising:

a cluster arm rotatable about a cluster axis characterized by a cluster angle, the plurality of ground contacting members are rotatable about a member axis fixed with respect to a cluster arm;

a plurality of frame members comprised of square tubing, said frame members being connected to each other to form the bottom, sides, front, and back of said trailer, such that said bottom, sides, front, and back of said trailer each include at least two parrallel members;

said bottom frame members including a tongue attachable to an ATV by hitch means, and a main axle upon which the cluster arm assembilies are attached, a trailer box constructed from a composite plastic material, a fender attached to the said trailer box curving upwardly, then rearwardly, then downwardly, then upwardly above said tires, angles for stiffening the corners where said bottom frame members join to said frame members to join tongue, a center horizontal frame member on the bottom extending forwardly to form a tongue.

2. A trailer according to claim 1 wherein the ground contacting members are wheels.

* * * * *